United States Patent [19]

Gray et al.

[11] Patent Number: 4,584,139
[45] Date of Patent: Apr. 22, 1986

[54] HYDROGENATION OF LONG CHAIN OLEFINIC OILS WITH RANEY CATALYST

[75] Inventors: Thomas J. Gray, Guilford; Norman G. Masse, Wallingford; Tai-Nang Huang; Michael J. Morgan, both of Guilford, all of Conn.

[73] Assignee: Olin Corporation, Cheshire, Conn.

[21] Appl. No.: 462,267

[22] Filed: Jan. 31, 1983

[51] Int. Cl.$^4$ ............................................. C11C 3/12
[52] U.S. Cl. .................................................. 260/409
[58] Field of Search ....................................... 260/409

[56] References Cited

U.S. PATENT DOCUMENTS

| | | | |
|---|---|---|---|
| 3,701,793 | 10/1972 | Schmidt et al. | 260/409 |
| 3,792,067 | 2/1974 | Coombes et al. | 260/409 |
| 3,809,708 | 5/1974 | Minor | 260/409 |
| 3,896,053 | 7/1975 | Broecker et al. | 260/409 X |
| 3,932,534 | 1/1976 | Fukunaga et al. | 260/409 X |
| 4,240,895 | 12/1980 | Gray | 204/290 R |

OTHER PUBLICATIONS

Janet M. Snyder, H. J. Dutton and C. R. Scholfield, "Laboratory-Scale Continuous Hydrogenation", *Journal of the American Oil Chemists' Society* (JAOCS), Apr. 1978, vol. 55, pp. 383–386.

R. R. Allen, "Hydrogenation", *JAOCS*, 58(3), Mar. 1981, pp. 166–169.

R. C. Hastert, "Practical Aspects of Hydrogenation and Soybean Salad Oil Manufacture", *JAOCS*, 58(3), Mar. 1981, pp. 169–174.

John Corbett, "Catalysts", *Chemical Marketing Reporter Features Chemical Business*, Nov. 15, 1982, p. 16.

*Primary Examiner*—Helen M. S. Sneed
*Attorney, Agent, or Firm*—Donald F. Clements; James B. Haglind

[57] ABSTRACT

An improved monolithic hydrogenation catalyst and processes for using same to hydrogenate animal and vegetable oils, said catalyst being comprised of a Raney metal alloy surface layer integral with and derived from a selected nickel alloy monolithic substrate mesh structure wherein said surface layer is predominantly derived from an adherent Beta structured crystalline precursor outer portion thereon. The catalyst is adaptable to both continuous and batch hydrogenation and shows enhanced activity, improved triene to diene selectivity and a low isomerization index. Hydrogenated oils show lower linolenic and stearic contents, lower trans-isomer percentages and lower melting points as compared to commercial products of equivalent iodine number.

32 Claims, 10 Drawing Figures

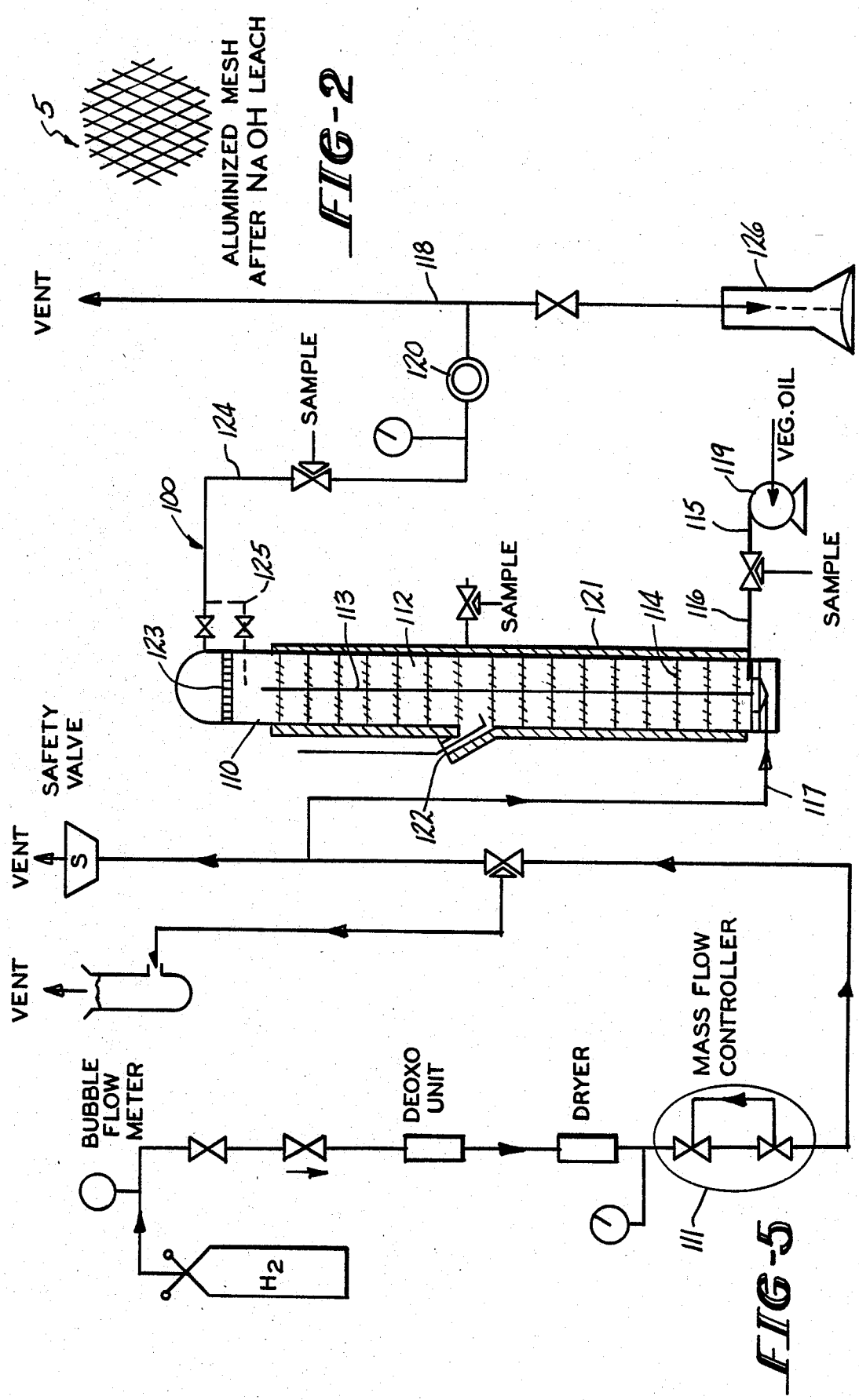

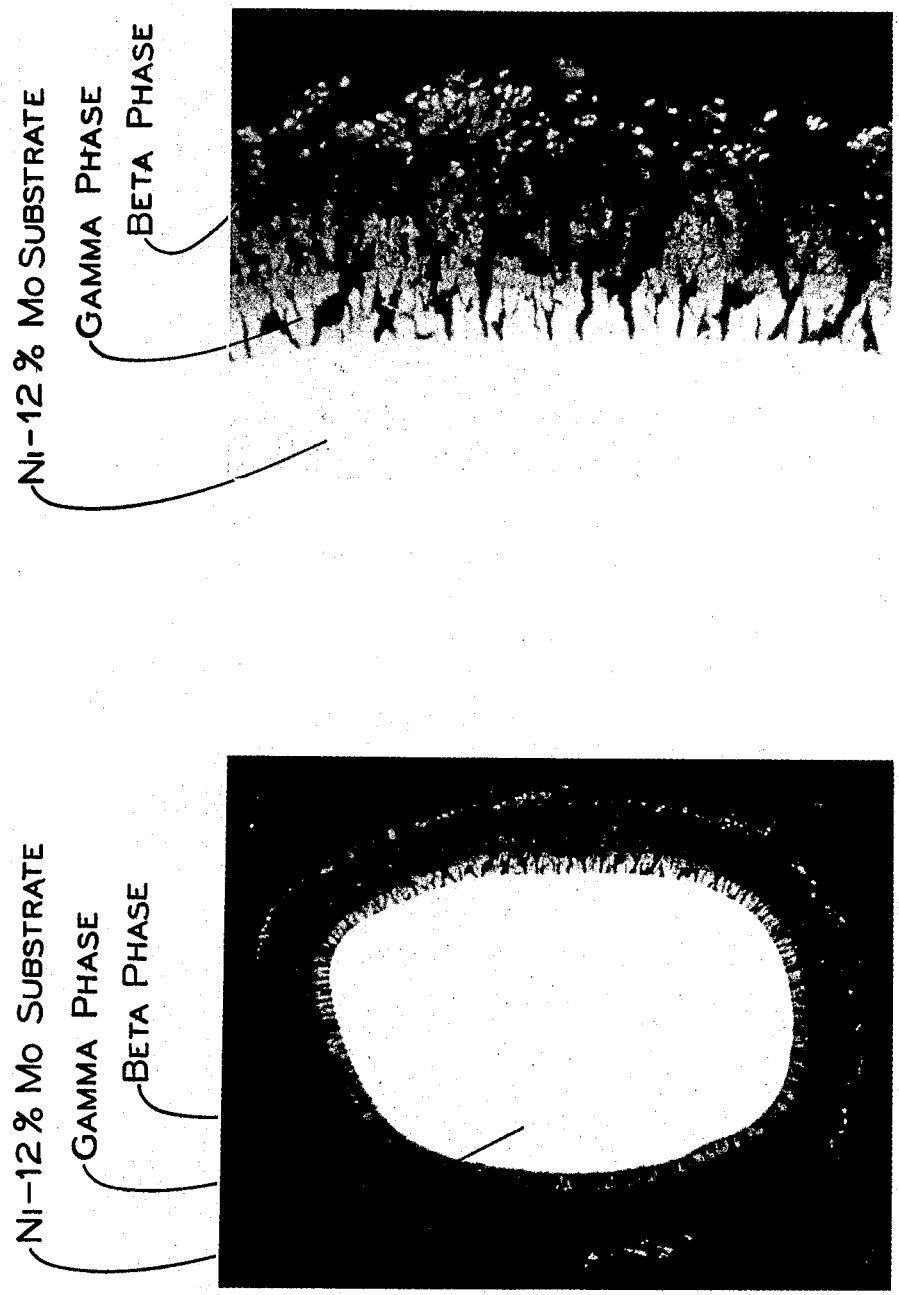

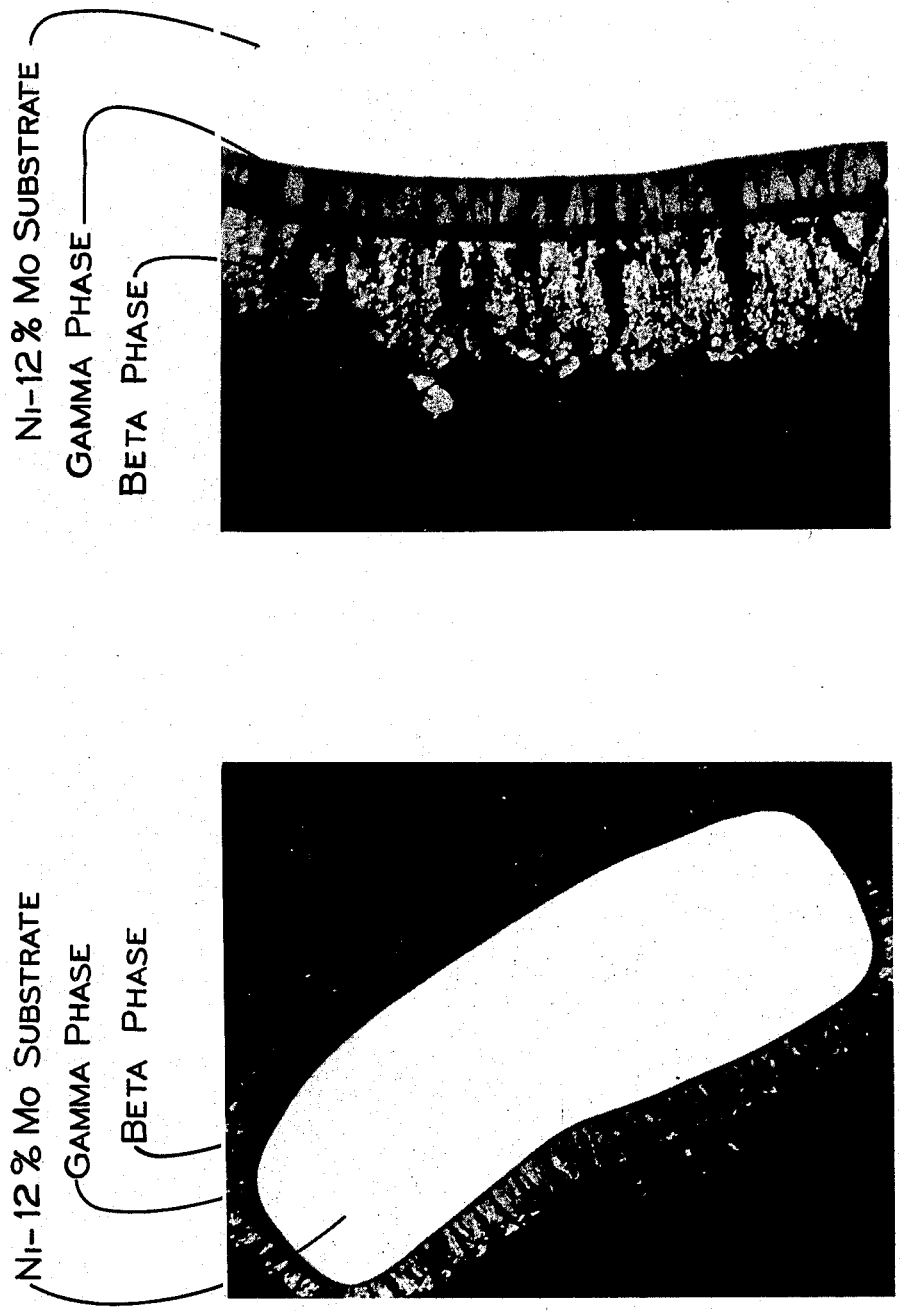

10g. Ni-12% MO CATALYST, H₂ @ 20 PSIG. 195°C 1. 0.2g. COMMERICAL RANEY Ni CATALYST H₂ @ 20 PSIG. 195°C
2. 10g Ni-12% MO CATALYST, H₂ @ 20 PSIG. 195°C

HYDROGENATION OF LONG CHAIN OLEFINIC OILS WITH RANEY CATALYST

BACKGROUND OF THE INVENTION

This invention relates to a process for the hydrogenation of long chain unsaturated olefinic compounds, and more particularly, the hardening of animal and vegetable oils to produce salad oil, margarine, shortening and the like using Raney nickel alloy catalysts as hydrogenation promoters.

Raney nickel is a well-known hydrogenation catalyst which was described originally in U.S. Pat. No. 1,638,190 issued to Raney on May 10, 1927. Raney nickel is prepared by alloying nickel and aluminum and leaching out the aluminum with alkali to expose nickel as a finely divided porous solid in which form nickel is an effective hydrogenation catalyst.

Subsequently, improved nickel catalysts have been provided in the art by alloying various metallic constituents with the nickel and aluminum prior to the treatment with alkali. For example, in U.S. Pat. No. 2,948,687 issued to Hadley on Aug. 9, 1960, molybdenum is alloyed with nickel and aluminum and treated with alkali to provide a nickel-molybdenum alloy catalyst. The use of such catalysts either as finely divided powders or precipitated onto a support structure such as $Al_2O_3$ is well known and such catalysts are widely used at the present time in a number of catalytic synthesis operations.

One industry in which such catalysts find use is the "hardening" of crude vegetable and animal oils such as soybean oil, corn oil, cod liver and whale blubber oil to produce commercial products for use in foods, lubricants, paints, fuels and the like. In the "hardening" process, the oil is hydrogenated to reduce the total unsaturated content as measured by the iodine value of the oil and consequently raise the melting point of the oil so treated. Of particular importance in many hydrogenation techniques is the removal of the triene unsaturation (linolenic acid), which is primarily responsible for problems of rancidity and off-taste of soybean oil and similar oils.

The modern hydrogenation process for edible products such as salad oil, margarine and vegetable shortening originated in research work conducted at the turn of this century. In this process, edible oils, such as cottonseed, soybean, and corn oil, are placed within a reaction vessel (commonly termed a "convertor") and brought into contact with hydrogen at elevated temperature and pressure in the presence of a small amount of metal hydrogenation catalyst. In modern units, the catalyst is usually present in small amounts which may range from 0.01 to about 0.5 percent by weight based upon the total weight of the oil being subjected to hydrogenation. With soybean oil, such hydrogenation techniques can produce commercially useful salad oil, margarine and shortening products having nominal unsaturation percentages and iodine values as shown in Table I. Whichever product is produced is primarily a function of the process conditions utilized.

TABLE I

"HARDENED" SOYBEAN OIL PRODUCT COMPSITIONS

| | Palmitic and Stearic* Acids (C16:0/C18:0) | Oleic* Acid (C18:1) | Lino-lenic* Acid (C18:2) | Lino-lenic* Acid (C18:3) | Iodine Value (IV)** |
|---|---|---|---|---|---|
| "crude" oil | 14.5 | 22.1 | 55 | 8.4 | 130–140 |
| salad oil | 21 | 39 | 37 | 3 | 110–118 |
| margarine | 29 | 37 | 31 | 2.5 | 95–102 |
| shortening | 33 | 40 | 25 | 2 | 80–90 |

*Nominal percentages as reported in the literature.
**As determined by the Wijs procedure.

Various types of hydrogenation catalysts are known for providing the reaction between hydrogen and the edible oil. For example, one commercial hydrogenation catalyst includes the metal nickel as the principal catalytic agent, but it also may have minor amounts of copper, alumina, or other materials. The metal hydrogenation catalysts are employed principally in a finely defined divided form and are prepared by a variety of methods. Commonly, the nickel metal is placed upon a finely divided, highly porous, inert refactors material, such as diatomaceous earth, or other highly siliceous material. The catalyst is suspended in the oil during the hydrogenation process as an oil-coated inert granular solid, which may adsorb soaps or other impurities often found in the crude oil.

After the hydrogenation reaction is completed to the desired degree, the reaction materials are removed from the convertor and passed through a filtration system to remove the inorganic solids from the hydrogenated edible oil product. Various inorganic materials may also be added at this time to the oil to enhance its filterability. Generally, pressurized filter press assemblies are used, in parallel flow arrangements comprising a plurality of filter elements made from paper, canvas or other types of filter media. These filter elements may be pre-coated with some type of diatomaceous earth or other filter aid to improve oil filterability. However, it is found that such filters do not always remove all of the inorganic solids and secondary "polishing" steps may also be required.

In the process as described above, it has been known for many years that Raney catalysts, in the form of granular powders, will selectively harden crude animal and vegetable oils. However, they are not widely utilized for this purpose since many Raney catalysts are quite sensitive to low levels of thiophene and other forms of sulfur contamination in the feedstock. Also, finely granulated Raney catalysts are difficult to handle, with many being sufficiently active to exhibit pyrophoric or self-ignition properties if exposed to air. Where supported catalysts are used, it is further found that poorer control over the total process is achieved dye to a small portion of the oil being absorbed for some period of time by the support. This results in a non-uniform contact time with the catalyst and consequent increased variability in the product output. Also, many supporting media exhibit some catalytic activity themselves so that additional negative effects in the compositional integrity of the final product may occur. Such effects may include excessive cis-trans conversion, double bond migration, and co-polymerization. All of these effects, even if occurring at low levels are undesirable from the standpoint of producing edible products.

Further, with such catalysts it is more difficult to control the exothermic temperature rise experienced during the reaction. Such an occurrence can result in local overheating and cracking of the carbonaceous feedstock to form coke, tars and other adhesive products on the surfaces quickly leading to a significant decrease in catalytic activity.

It is also known that continuous processing techniques can be used for oil processing. However, while many processes, such as that described by Coombes et al in U.S. Pat. No. 3,792,067 dated Feb. 12, 1974, have been proposed, there are presently few such systems now operating in the United States; with most of these more nearly resembling a serial plurality of batch reactors than a true unitary continuous operation of the type as commonly used, for example, in many petrochemical synthesis processes. Results reported for such systems, summarized in Table II, show relatively low flow rates and poor olefinic compositional percentages due to the low linolenic and linoleic conversion selectivities found with many of the catalysts used, as compared to the nominal values for commercially useful products shown in Table I. Further, there seem to be perceived difficulties in changing feedstock or end product, and in keeping the catalyst surfaces clean of deposits from the small quantities of soaps and other gels found in most commercially produced oils.

Recently, Gray has disclosed, in U.S. Pat. No. 4,240,895 dated Dec. 23, 1980, a Raney material comprised of a monolithic metallic mesh core having an integral Beta structured Raney nickel alloy exterior surface thereon which is used as an electrode to reduce hydrogen overvoltage.

These and other objects of this invention will become apparent from the following description and the appended claims.

BRIEF DESCRIPTION OF THE INVENTION

The present invention provides an improved process and apparatus for the hydrogenation in animal and vegetable oil hydrogenation reactions, said process comprising the use of an improved Raney catalyst for said hydrogenation in said apparatus, said catalyst being comprised of a Raney metal alloy surface layer integral with and derived from a selected nickel alloy monolithic substrate mesh structure wherein said surface layer is predominantly derived from an adherent Beta structured crystalline precursor outer portion thereon.

Another embodiment of the invention is provided by the use of a monolithic Raney alloy hydrogenation catalyst comprised of an integral Raney metal alloy surface layer on a metallic mesh substrate, said Raney metal alloy surface being predominantly derived from an adherent $Ni_xM_{1-x}Al_3$ Beta structured crystalline precursor surface layer, where M is a catalytic activator selected from the group consisting of molybdenum, titanium, tantalum, ruthenium or mixtures thereof and where x, the weight fraction of nickel in the combined NiM alloy, is from about 0.80 to about 0.95.

The invention further comprises a method for hydrogenating triglyceride vegetable oils comprised of a mixture of substantially linear aliphatic chains having varying amounts of saturated, and mono-, di- and tri-olefinic constituents, comprising:

(a) admixing hydrogen with said vegetable oil to form a mixture;

TABLE II

| | | | | Space | Composition (%) | | | | | | |
|---|---|---|---|---|---|---|---|---|---|---|---|
| Study # | Catalyst | Temp. (°C.) | Pressure (psig) | Velocity (1/hr-kg) | C16:0/ C18:0 | C18:1 | C18:2 | C18:3 | IV**** | Isomerization Index*** | Selectivity |
| 1 | Raney Ni* on Al$_2$O$_3$ | 145 | 30 | 0.8 | 24.7 | 39.4 | 32.4 | 3.5 | 95.3 | 0.48 | 1~1.5 |
| 2 | Raney Ni* on Al$_2$O$_3$ | 190 | 127.5 | 0.4 | 18.7 | 39.5 | 37.9 | 3.9 | 106.8 | 0.78 | 1.5~2 |
| 3 | Pd/Al$_2$O$_3$* | 180 | 30 | 1.0 | 19.9 | 28.7 | 46 | 5.4 | 110 | 0.81 | 1.3 |
| 4 | Cu/Chromite* | 185 | 60 | 0.48 | 13.6 | 25.8 | 54.3 | 6.3 | 125 | 0.96 | 1.2 |
| 5 | Ni:Al* (50:50) | 100 | 75 | 7.6 | 22.3 | 31.7 | 40.8 | 5.8 | 108 | 0.60 | 1.5~2 |
| 6 | Pd:Al* (5.95) | 110 | 23 | — | 17.1 | 24.8 | 50.3 | 7.8 | 119 | 0.55 | 1.1 |
| 7 | Cu/Cr$_2$O$_3$** (78:20) | 153 | 30 | 0.3 | 16.7 | 42.9 | 37.8 | 2.6 | 109 | 0.65 | 3 |
| 8 | Cu/Cr$_2$O$_3$** (78:20) | 120 | 30 | 0.25 | 16.1 | 46.4 | 36.7 | 0.8 | 106 | ~0.70 | 4 |
| | "Crude" Soybean Oil | | | | 14.5 | 22.1 | 55.0 | 8.4 | 130–140 | | |

*JAOCS 52, 282 (1975); fixed-bed reactor was used.
**JAOCS 59, 333 (1982); trickle-bed reactor was used.
***Isomerization Index = Δ% trans-isomer/ΔIV.
****Iodine value.

OBJECTS OF THE INVENTION

It is the object of this invention to provide an improved process and apparatus for the catalytic hydrogenation of animal and vegetable oils.

It is a further object of this invention to provide an improved Raney nickel alloy catalyst for said hydrogenation.

It is still a further object of this invention to provide an improved Raney nickel alloy catalyst which can be utilized both in continuous flow and batch hydrogenation systems.

(b) heating said mixture in the presence of a catalyst at a temperature in the range between about 125° C. and about 350° C., said catalyst comprising a plurality of metallic mesh plates, each of said plates comprising a Raney metal alloy surface layer integral with and derived from a selected nickel alloy monolithic substrate mesh structure wherein said surface layer is predominantly derived from an adherent Beta structured crystalline precursor outer portion thereon, said surface layer being predominantly derived from an adherent $Ni_xM_{1-x}Al_3$ Beta structured crystalline precursory layer where M is a catalytic activator and where x, the fraction of nickel in the combined weight of Ni and M, is up to about 0.95, whereby said vegetable oil is hydrogenated; and (c) recovering said hydrogenated oil.

The invention still further comprises a method of using said monolithic Raney catalyst in vegetable oil hydrogenation reactions wherein said catalyst is (a) coating with aluminum the surfaces of a clean, non-porous perforated metal base structure of an alloy comprising from about 20 to about 5 percent by weight of a catalytic activator selected from the group consisting of molybdenum, titanium, tantalum, ruthenium or mixtures thereof, and from about 80 to about 95 percent by weight of nickel;

(b) heating said coated mesh surfaces by maintaining said surfaces at a temperature of from about 660° C. to about 850° C. for a time sufficient to infuse a portion of said aluminum into outer portions of said structure to produce an integral alloy layer of nickel, the catalytic activator and aluminum in said outer portions predominantly of Beta structured grains, but insufficient in time to create a predominance of Gamma structured grains in said outer portions; and (c) leaching out residual aluminum and intermetallics from the alloy layer until a Raney nickel-catalytic activated alloy layer is formed integral with said structure.

The Raney nickel-catalytic activated alloy catalysts of this invention have been utilized in both continuous and batch processes for the hydrogenation of oils having high linolenic acid (a triene) contents such as soybean oil and linseed oil as well as those being substantially free of such a constituent such as corn oil, cottonseed oil and the like, all of these oils being comprised of triglycerides having a mixture of linear aliphatic and olefinic components, each typically, having between about 12 and about 22 carbon atoms.

In such use, it is found that the catalyst exhibits higher activity, superior selectivity (defined as the ratio of the rate of linolenate hydrogenation to that of linoleate hydrogenation) and longer effective life, when compared to prior art catalysts. Further, at equivalent iodine values, the hydrogenated products produced tend to show lower levels of saturates and cis-trans conversion than those normally produced by such catalyts.

Also, it has been found that the mesh embodiment of the catalyst of the present invention is applicable to either batch or continuous flow techniques using processing parameters that are essentially consistent with those used with prior art catalysts. When this is done, it is found that the results achieved are substantially advantageous as compared to prior art catalysts and catalytic processes.

BRIEF DESCRIPTION OF THE DRAWINGS

FIG. 2 shows the overall appearance of an expanded mesh embodiment of the catalyst of FIG. 1 after NaOH leaching.

FIG. 3 is a 250× photomicrograph of a section of the mesh embodiment of the catalyst of FIG. 2 showing a Raney Ni-Mo layer after heat treatment and leaching.

FIG. 4 is a 750× enlargement of a section of the Raney coating of FIG. 3.

FIG. 5 is a schematic drawing of an exemplary continuous flow hydrogenation system in which the catalyst of the present invention may be used.

FIG. 6 is a 150× photomicrograph of the catalyst of FIG. 2 as it appeared after 320 hours of catalytic use showing the Raney coating still largely intact with substantially no coke formation or other contamination on the surface.

FIG. 7 is a 800× enlargement of a section of the Raney coating of FIG. 6.

DETAILED DESCRIPTION OF THE PREFERRED EMBODIMENTS

This invention is described in terms of the preparation and use of a monolithic Raney nickel alloy catalyst having about 5 to about 20 percent by weight of molybdenum therein. It should be understood that the use of molybdenum is merely illustrative and that it may be replaced in whole or in part by ruthenium, titanium, tantalum or mixtures thereof in the broader aspects of the invention.

Catalyst Preparation

Figure 1:
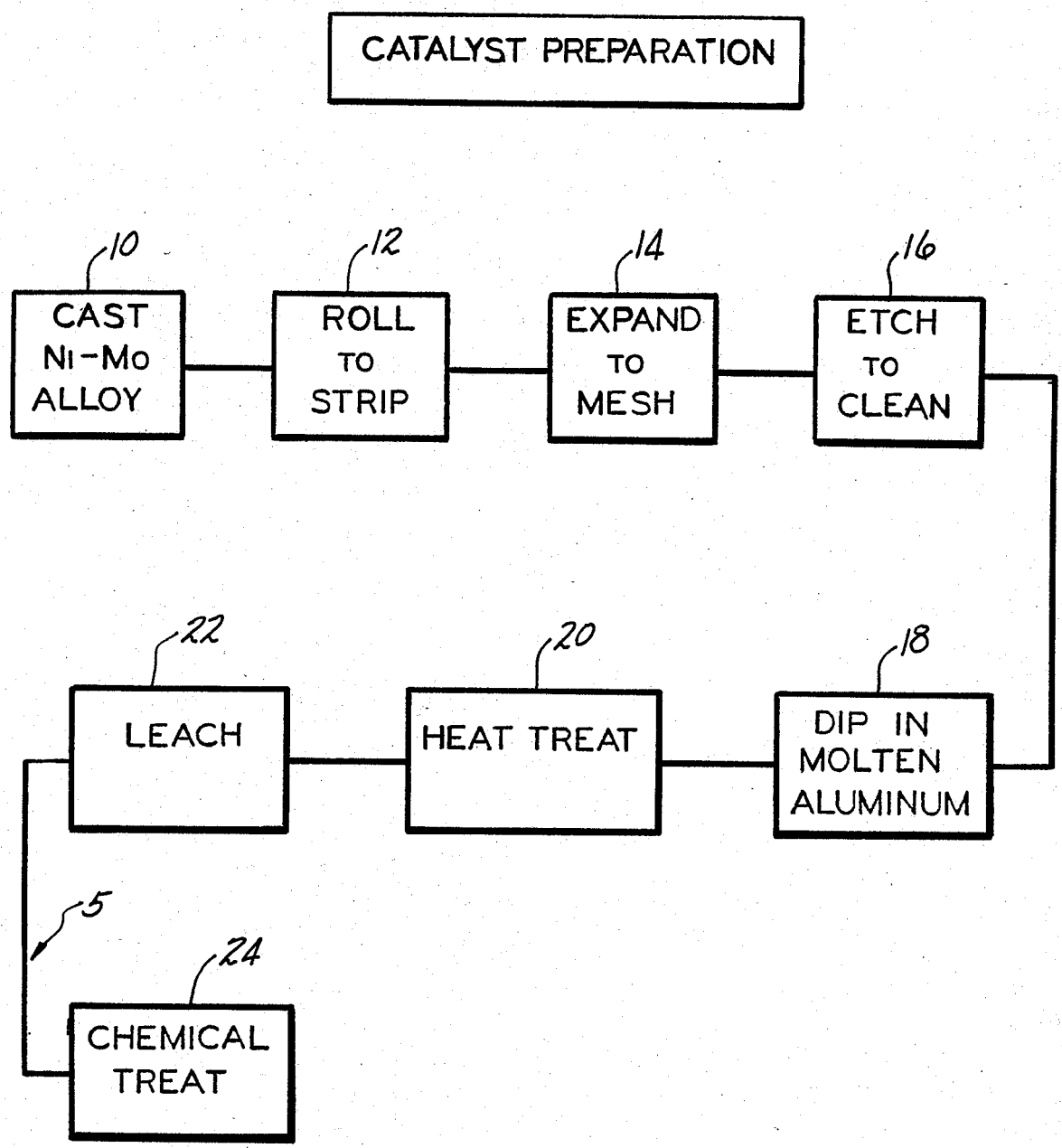
FIG. 1 is a flow diagram of a process for the preparation of an expanded mesh embodiment of the catalyst as used in the present invention.

Catalyst (5) of the present invention may be prepared in one embodiment as shown in FIG. 1. The integral Raney nickel alloy surface of the monolithic catalyst (5) of this invention is formed on a supportive nickel bearing core or substrate. While cores of substantially pure nickel or an approximate nickel bearing alloy such as Inconel 600, Hastelloy C or 310stainless steel can be used, it is preferred to have the outer portions of the core (core is used interchangeably herein with substrate) itself serve as the nickel bearing alloy outer layer. Where cores of other materials or alloys are used, a nickel alloy coating of the desired composition should first be deposited onto the surfaces thereof by a variety of known techniques such as metal dipping, electroplating, electroless plating and the like. This coating should be at least 100 microns and preferably at least 150 microns thick. This helps to substantially improve the thermal stability of the coating by making the transition across the coating/substrate interface much less abrupt and thus greatly reducing tensile stresses and the possibility of corrosion and subsequent failure at this interface.

Accordingly, the core material for the catalyst of the present invention comprises an alloy in which nickel and the selected alloying material are melted together to form a precursor ingot (10) having the desired composition. The preferred alloy weight percentage for the molybdenum component is between about 10 and about 18; for ruthenium, it is between about 5 and about 10 percent; for tantalum, it is between about 5 and about 15 percent; and for titanium, it is between about 5 and about 10 percent. The cast ingot is then rolled out to form a sheet or strip (12) preferably in the thickness range of between about 0.01 and about 0.02 inch.

While support for the catalyst of the current invention can be in the form of any conveniently shaped structure, a perforated metal base, particularly an expanded metal screen or mesh (14), is preferred. Such an open structure is found to be a significant factor in providing a catalytic process having substantial life-time and operational advantages over other types of catalytic structures used for this purpose. The final mesh which is prepared by conventional metal expansion techniques forms a regularly shaped diamond or square celled structure. The thickness and mesh opening values are not critical and, depending on such factors as alloy composition and reaction parameters, cell sizes from about 0.1 to about 1.0 inches on a side can be used. Further, mesh or screens for use in forming the catlyst of this invention can be made by such techniques as weaving drawn wire, closely spacing punched holes in a rolled sheet and similar techniques.

Prior to further processing, mesh (14) is thoroughly cleaned by conventional means, such as degreasing, acid etching and/or grit blasting (16) to remove surface contaminates and thus improve the wetting of the subsequently applied aluminum to the surface.

Formation of the catalyst surface begins when this clean surface is subjected to an aluminizing treatment (18). By "aluminizing", as used herein, it is meant that aluminum is brought into intimate contact with the cleaned nickel bearing alloy at the surface of the core so that when heat-treated at interdiffusion step (20), the desired nickel alloy-aluminum alloy layer is formed. This can be accomplished by any of several known methods such as flame or plasma spraying the aluminum onto the surface of the core, dipping the core into molten aluminum or by the use of fused salt electrolysis, with dipping being preferred.

Whichever method of aluminizing is used, an aluminum layer of at least 100-micron thickness should be deposited on the surface of the core. Much thicker aluminum layers of, for example, greater than 500-micron thickness, perform satisfactory in the process but for reasons of economy, aluminum layer thicknesses of between about 150 and about 300 microns are preferred. With dipping, such a thickness is achieved in a time of between about 0.5 and about 5.0 minutes when the aluminum is between about 600° C. and about 700° C.

Interdiffusion step or heat-treat step (20) is carried out at a temperature in the range of about 660° C. and about 850° C. To drive the interdiffusion process at a reasonable rate, higher temperatures should be used. For this, a temperature within the range of from about 700° C. to about 750° C. and particularly from about 715° C. to about 735° C. is most preferred. Usually interdiffusion is carried out in an atmosphere of hydrogen, nitrogen or an inert gas to prevent oxidation of the surface. This interdiffusion heat treatment is continued for a time sufficient for the aluminum and nickel alloy to react to form a nickel alloy-aluminum ternary alloy of at least about 40 microns and preferably at least about 80 microns in thickness. Interdiffusion times within the range of from about 5 to about 30 minutes satisfy this need. For nickel-molybdenum, interdiffused alloy layers of about 100 to about 400 microns in thickness are preferred, with best results obtained with a thickness from about 150 to about 300 microns.

During heat treatment at temperatures above about 660° C. excessively long interdiffusion times, e.g. 1 hour or more, and excessively high temperatures, should be avoided for technical as well as economic reasons. For example, at temperatures above about 855° C., the Beta phase quickly transforms into liquid and Gamma phase. Further, if interdiffusion at any temperature is continued too long, especially at interdiffusion temperatures of much above about 800° C., the intermetallic NiAl (Eta phase) forms which is quite resistant to subsequent leaching of the aluminum so that a satisfactory Raney surface will not form.

For coatings on a substrate differing in composition from the coating, extended heat treatments can damage the substrate or form undesirable brittle intermetallics at the coating substrate interface. For example, if aluminum is diffused into a nickel alloy coated steel core, excessive interdiffusion time or temperature can result in the aluminum "breaking through" to diffuse into the steel base of the core. This results in the formation of a very brittle $FeAl_3$ intermetallic phase which will significantly undermine the strength of the bond between the core and the interdiffused layer.

By providing sufficient quantities of aluminum and nickel, while avoiding excessively long treatments or excessively high temperatures during interdiffusion, breakthrough and formation of the undesired intermetallics are avoided.

The formation of the desired integral nickel-molybdenum-aluminum Beta structrued ternary alloy layer is followed by a selective leaching step (22), wherein sufficient aluminum is removed to form an acitve Raney surface layer. For this, a strong aqueous base, such as NaOH, KOH or other strongly basic solution capable of dissolving aluminum, is generally used. Preferably, leaching is carried out with an aqueous caustic solution containing about 1 to about 30 weight percent NaOH. A preferred selective leaching procedure for producing porous nickel alloy surfaces of the invention is carried out first for about 2 hours with about 1 percent NaOH, then for about 20 hours with about 10 percent NaOH, both of these substeps being under ambient conditions in which temperature is not controlled, and finally for about 4 hours with about 30 percent NaOH at about 100° C. This leaching procedure removes at least about 60 percent, and preferably between about 75 to about 95 percent, of the aluminum from the interdiffused alloy layer, and as shown in FIGS. 3 and 4 provides a porous surface of unusually high catalytic activity. It is recognized that the leaching conditions can be varied from those mentioned above to achieve equally effective selective dissolution of the aluminum.

The appearance of catalyst (5) after leaching step (22) is shown in FIG. 2. A 250× cross section of a strand of treated Ni-12%Mo expanded metal is shown in FIG. 3 and a 750× enlargement of the porous Raney surface coating of FIG. 3 is shown in FIG. 4. In these microphotographs, it is seen tht the Beta structured Raney Ni-12%Mo layer is about three times as thick as the underlying Gamma layer. Since the predominant Beta layer is the outer layer which will be in contact with any medium in which the coated core is placed and is what serves to control the catalytic activity of the coating, the catalytic structure shown in FIGS. 3 and 4 is referred to as having a Beta Raney Ni-12%Mo coating. It should be also be noted that the active Raney surface comprises only between about 3 and about 10 percent of the total catalyst weight. As a result, activity and other processing factors based on catalyst "weight" will tend to be more conservative than may actually be the case. Further, the substructure retains its ability to generate active coating material so that in the event the coating dies of old age, is poisoned or is physically damaged, it may be removed from the mesh substrate by means such as sandblasting or etching leaving a fresh alloy surface to be aluminized, heat-treated and etched as hereinabove described.

After the selective leaching, the active nickel alloy coating may exhibit a tendency to heat up when exposed to air. If uncontrolled, this self-heating or pyrophoric tendency can easily lead to problems with coating ignition with consequent severe damage to the coating. However, chemically treating (24) the porous nickel alloy layer has been found to eliminate this problem. Convenient methods for this chemical treatment include immersing the porous nickel alloy for between at least about 1 hour and about 4 hours in a dilute aqueous solution of an oxidant containing, for example by weight either (a) 3 percent $NaNO_3$, or
(b) 3 percent $K_2Cr_2O_7$, or
(c) 3 percent $NaClO_3$ and 10 percent NaOH, or
(d) 3 percent $H_2O_2$.

This treatment safely eliminates the self-heating tendency of the porous nickel alloy surface without diminishing either its catalytic activity or mechanical properties. At this point, the catalyst, after drying, can be safely exposed to air for ease in shipping and handling.

Before the catalyst is used for the first time, it must be "activated". This is done by treating the catalyst with a flowing stream of dry hydrogen at a temperature of between about 250° C. and 350° C. for a time of between about 2 and about 24 hours. Most conveniently, this operation is done in the reactor system before the first operation so that the activated catalyst need not risk an accidental exposure to air. Where the activated catalyst is not to be used immediately, it can safely be stored in degassed vegetable or mineral oil for extended periods until needed.

Hydrogenation

The underlying mesh structure of the catalyst of the present invention allows it to be readily adapted to both batch and continuous hydrogenation systems. Further, it has been shown to be able to selectively harden oils having high linolenic acid fractions, which contain 18 carbon atoms and three double bonds in the chain and which is hereinafter referred to as C18:3, such as linseed and soybean oils as well as those primarily comprised of high linoleic acid fractions, which contain 18 carbon atoms and two double bonds in the chain and which is hereinafter referred to as C18:2, such as corn, safflower and sunflower oils, to produce hydrogenated products having overall compositions fully comparable to those found in commercially available products. In addition to these oils noted above, other oils which may be hydrogenated in accordance with this invention include those derived from cottonseed, palm, peanut, sesame seed, olive, rape seed, coconut, tung nut and similar vegetable sources. Suitable animal fats and oils include herring, shark liver, cod liver, whale blubber, rendered cattle stearin, lard oil and the like.

(1) Continuous Operation

Referring now to FIG. 5, an exemplary continuous liquid/gas phase hydrogenation reaction system (100) in which the catalyst of this invention can be used is shown. Reactor (110) comprises at least one convertor (112) into which a plurality of layers (114) of catalyst (5) are placed, said layers being arranged so that the open structure of the mesh substrate is randomly oriented. As shown, the layers are separated by spacers (113) so that the reactive volume comprises substantially the total length of convertor (112). A steady flow of a "crude" vegetable oil which has usually been deaerated, bleached and deodorized prior to use is taken from an external source (not shown) and pumped, into the interior of convertor (112) by pump (119) through conduit (115) and oil inlet (116). Hydrogen is admitted to the interior through gas inlet (117). To maximize oil/gas contact, gas inlet (117) comprises preferably a sparger or some other means for producing relatively small gas bubbles and high levels of turbulence in the oil stream. It should be noted that while a concurrent flow technique is shown in FIG. 5, countercurrent flow techniques are equally adept in the hydrogenation process of this invention.

The entering gas/liquid stream enters the bottom of convertor (112) and passes upwardly therethrough, contacting catalyst layers (114) and reacting enroute to form a partially saturated or hardened compound having an iodine valve range corresponding to the product of interest. Oil volumetric flow rate is dependent both upon the physical dimensions of convertor (112), the capacity of oil pump (119) and the particular product being produced. Hydrogen flow rate is established by mass flow controller (111) on the hydrogen source and flow rates of between about 0.1 and 1 ft.$^3$/min and preferably between about 0.3 and 0.6 ft.$^3$/min are used. Gas pressure in the system is adjusted with back pressure regulator (120). While gas back pressures up to about 45 p.s.i.g. can be used, operation at a back pressure of between about 12 and about 18 p.s.i.g. is preferred. At such pressures, a full range of "commercial" products can easily be produced with few temperature and flow rate adjustment problems. However, vacuum or higher pressure modes can easily be incorporated into the system, if desired.

In reactor (110), temperature control is established and maintained, for example, by thermal heater/blanket (121) which is wrapped around the exterior of convertor (112). In the system as described herein, the nominal working temperature range, as measured, for example by thermocouple (122) is between about 125° C. and about 210° C., with about 160° C. to about 195° C. being preferred. However, preheating the incoming reactants prior to their entering the system or using internal heating means are also suitable to achieve the proper system temperature.

With the mesh catalyst of the present invention, the open structure presents a relatively low impedance to fluid flow so that the observed pressure drop through the reactor is quite small. This low pressure drop combined with high natural reactivity allows extremely high flow rates through the system. Soybean oil hydrogenation to produce salad oil is achieved at space velocities of up to about 35 liters per hour per kg of catalyst.

The reaction products pass first through porous filter (123) at the output of convertor (112) to remove any solid particles present and then leave the reactor through discharge tube (124) to receiver (126). In practice, it has been found that such filtration is only required for a short period during initial catalyst use to remove small particles of catalyst which have broken loose. If desired, filter 123 could be bypassed for all runs made, for example, after a period of about 1 hour at a space velocity of about 20. Even with frequent startup and shutdown situations, additional filtration is generally not required thereafter. The reaction products can then be removed from convertor (112) through filter by-pass line (125). Excess hydrogen is removed through gas outlet (118) and can be recovered for reuse within the system.

In a typical system, at a temperature of about 175° C., a gas pressure of 15 p.s.i.g., a gas flow rate of about 0.5 ft.$^3$/minute and a fresh charge of catalyst, the catalytic activity as shown by the flow rate/product relationship in Table III prevailed:

TABLE III

| Product | Iodine Value | Space Velocity 1/hr.-kg. |
|---|---|---|
| Salad oil | 109-115 | 16-28 |
| Margarine | 94-102 | 12-16 |
| Shortening | 80-90 | 8-12 |

While catalytic activity tended to decline somewhat with extended use, it was found that the flow values achievable, even after some 320 hours of use in numerous start/stop, i.e., short running time, situations, were still considerably higher than those found in prior art continuous flow reactor systems as shown in Table II.

The hydrogenation reaction is exothermic, releasing about 6000 cal./mole for each double bond hydrogenated, so that the temperature of the oil tends to increase as the reaction proceeds. As a result, some form of cooling may be incorporated into the reactor to keep the system at optimum temperature conditions. However, it is found that when the catalyst of the present invention is used in a linear tube, continuous reactor of the type shown in FIG. 5, the relatively high space velocities and short contact times achievable tend to substantially, if not completely, eliminate such a necessity.

When used in a reactor system of the type shown in FIG. 5, the catalyst of this invention demonstrates a number of other improved capabilities as compared to prior art catalysts. For example, once the system was started up, an equilibrium or isothermal condition was quickly established which was sustained, without difficulty, for extended periods. Depending on the particular operating conditions used, final products corresponding to salad oil, margarine and shortening were easily produced. Changing the oil space velocity to vary output product composition was found to be relatively easy and system response was quite rapid. At the temperatures and space velocities used, the problems noted in the prior art in stabilizing the reactor to prevent the formation of coke and consequent plugging of the catalyst surface did not occur since the rapid oil flow through the catalyst made the reaction essentially self-quenching.

When used as hereinabove described, the catalyst showed a relatively low loss of capability during extended usage. Thus, after processing an amount of oil equivalent to 420 gallons, or 3360 pounds, per pound of catalyst, the salad oil products produced at the "start" and "finish" showed only relatively minor differences in such factors as cis-trans ratio, olefinic composition and iodine value with no evidence of catalyst surface plugging or other degradation, being observed. Such production capability is well in excess of those reported for prior art "batch" catalysts. Since such catalysts are normally discarded after a single use, this long life represents a significant improvement.

Further, the selectivity (defined as the ratio of the rates of the triene to diene reaction, C18:3→C18:2, and the diene to monoene reaction, C18:2→C18:1) of this catalyst is also better. With soybean oil being processed, at a temperature range of about 160° C. to about 205° C. and a space velocity range from about 8 to about 35, selectivity values of between about 2 and about 6 were obtained as compared to values of between about 1 and about 2 reported for most of the prior art catalysts shown in Table II. As a result, the concentration of the undesirable C18:3 component, which is responsible for most of the problems with oxidative decomposition and rancidity in taste reported for soybean oil, is much more rapidly reduced than the concentration of C18:2 and the C18:1 constituents. Further, as utilized in convertor (112) to produce "commercial" products, the increase in higher melting point saturants produced by this catalyst is quite small; with that for salad oil being essentially nil, so that for all products, the total saturate percentage is lower and the nutritionally more desirable unsaturates percentages (dienes and monoenes) are higher than those found in most equivalent commercial products.

The catalyst of the present invention is also distinguished by producing a lower trans-isomer percentage and by having a lower isomerization index (defined as the ratio of the changes in % trans-isomer to the change in iodine value) as compared to present day commercially available catalysts. Thus, for salad oil produced by hydrogenating soybean oil at a temperature of 175° C., using the catalyst of this invention, the C18:1 trans-isomer content ranged from about 6 to about 8 percent, as compared to about 13.5 percent in commercial oil. The catalyst of this invention further showed an isomerization index ranging from about 0.3 to about 0.4, as compared to about 0.8 reported for prior art catalysts. Trans-isomers are also known to have higher melting points than the cis-isomers and when combined with the lower saturates percentages noted above, the salad oils produced by the process of this invention tend to have lower cloud points and require less "winterizing" than do salad oils produced by prior art catalysts.

FIG. 6 is a 150× enlargement of a strand of the catalyst of the present invention after 320 hours of use in the cell of FIG. 5 for the hydrogenation of soybean oil. During this time, in which soybean, corn, sunflower and linseed oils were all processed a total of about 4880 pounds of oil per pound of catalyst were processed in convertor (112). FIG. 6 shows that the surface is substantially free of carbon and other contaminants and that the overall thickness of the coating has not been materially reduced from its thickness prior to use (as shown in FIGS. 3 and 4). These effects are more clearly shown in FIG. 7 which is a 800× magnification of the coating of FIG. 6.

(2) Batch Process

Figure 8:
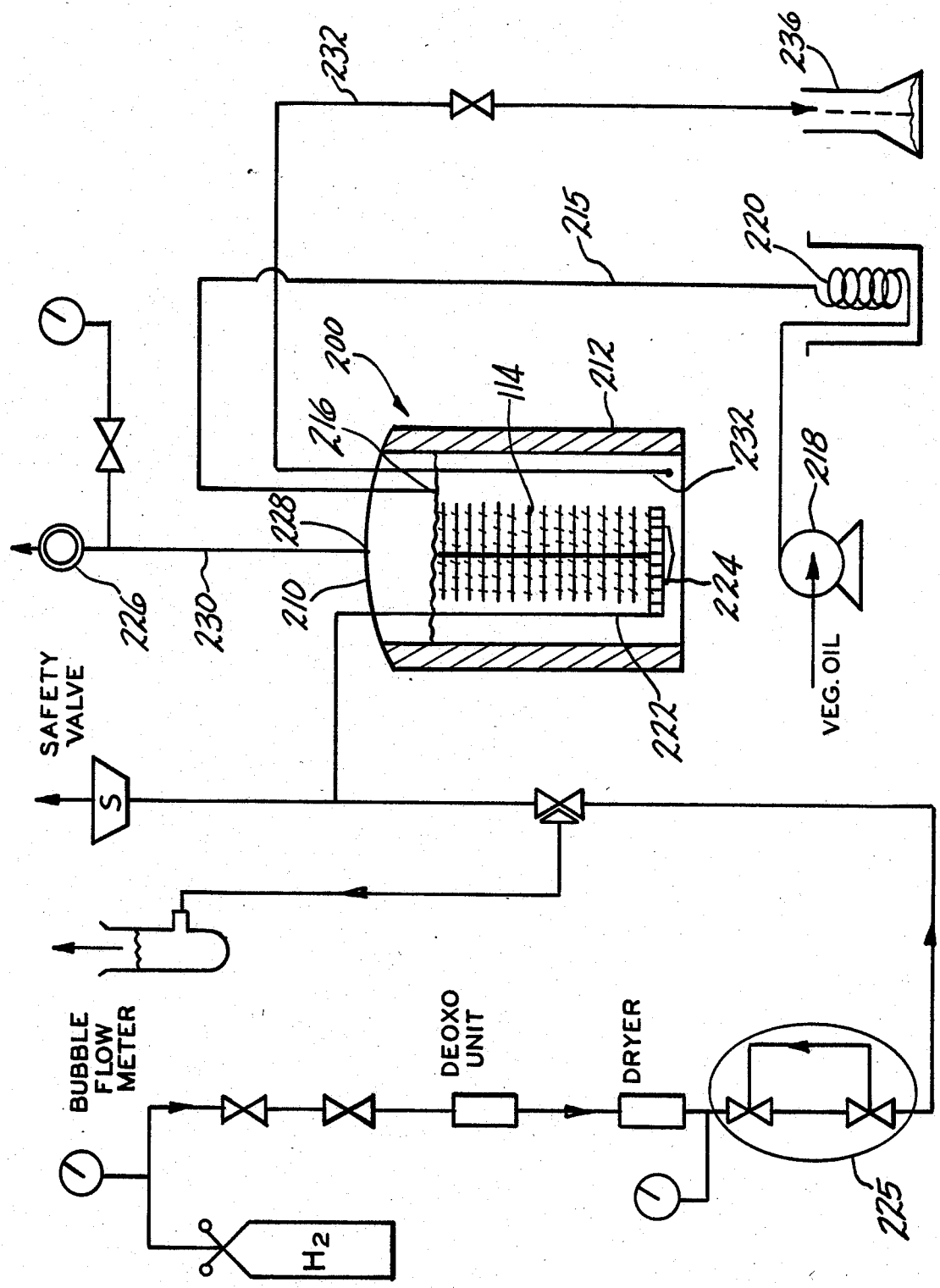
FIG. 8 is a schematic of an exemplary batch hydrogenation reactor system in which the catalyst of the present invention may be used.

Referring now to FIG. 8, an exemplary batch process system (200) in which the catalyst of this invention is shown. Reactor (210) comprises a conversion vessel (212), capable of holding high pressures up to at least about 400 p.s.i.g., into which a plurality of layers (114) of catalyst are stacked, said layers being arranged so that the open structure of the mesh substrate is randomly oriented. A preselected quantity of a "crude" vegetable oil from an external source (not shown) is admitted into the interior of vessel (212) through conduit (215) and oil inlet (216). For small systems, the oil can simply be poured into vessel (212) before it is sealed; but in larger systems, it can be pumped in with pump (218). Initial temperature control can be achieved either by oil preheater (220) or by internal heaters (not shown) within vessel (212) to achieve operating temperatures up to a range from about 150° C. to about 350° C. Hydrogen is admitted through gas conduit (222) and sparger (224) at a reaction pressure, generally of between about 10 and about 60 p.s.i.g. The flow rate needed to do this is established and maintained by mass flow controller (225) and back pressure regulator (226). In the configuration described, good contact with the catalyst is achieved by the turbulence introduced within the reactor by the gas bubbles from sparger (224) and no stirring or other agitation means is required. Hydrogen flow through the system is promoted by continuously bleeding off a portion through gas outlet (228) and gas outlet conduit (230). At the conclusion of the run, the hydrogenated product is removed via outlet conduit (232) to receiver (236).

Figure 9:
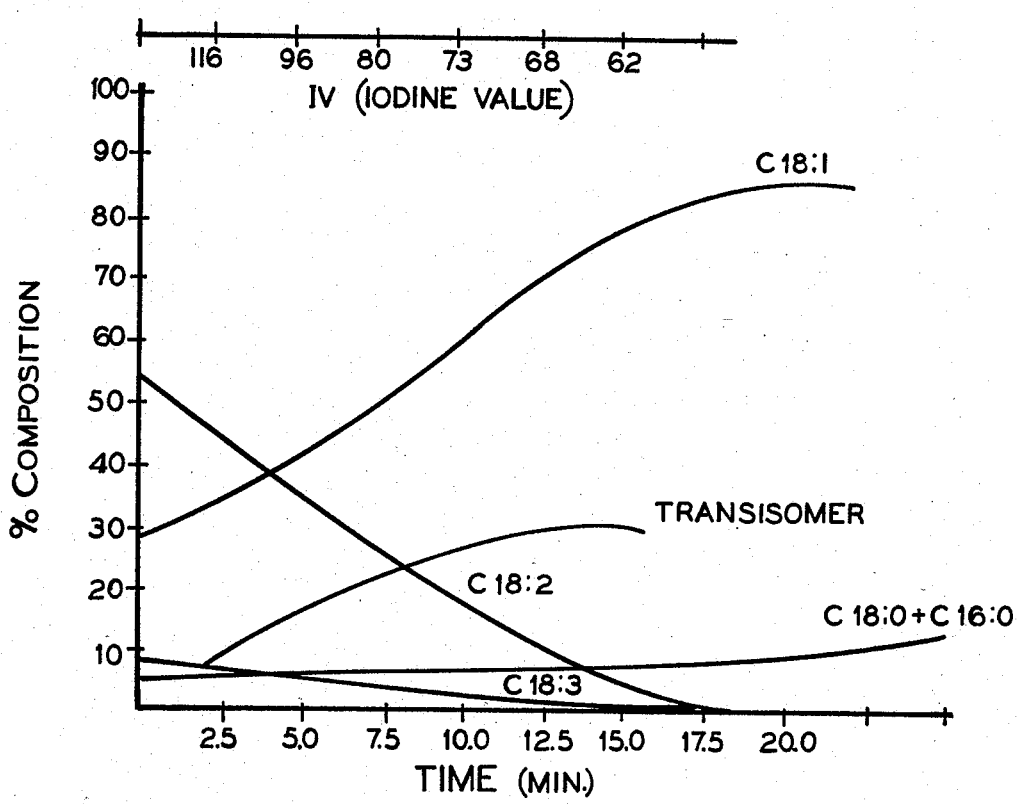
FIG. 9 is a curve showing the olefinic composition of processed soybean oil as a function of time in a batch-type convertor using the catalyst of the present invention.
Figure 10:
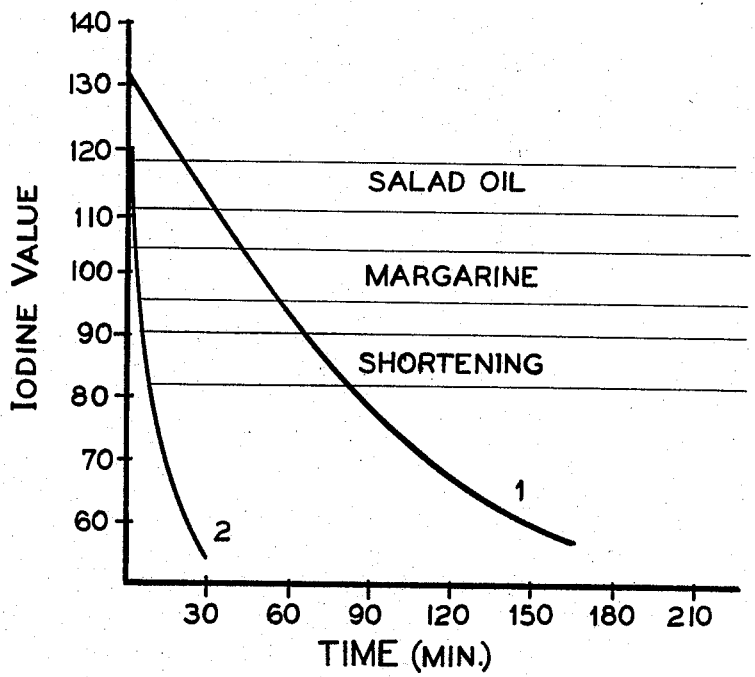
FIG. 10 is a curve comparing the response of soybean oil to the catalyst of this invention with that produced by a commercially available catalyst used for oil hydrogenation.

Curves showing olefinic composition and iodine value as a function of reaction time and the time/product relationships achieved with soybean oil processed in system (200) with fresh catalyst are shown in FIGS. 9 and 10.

The following examples are given to illustrate the invention and are not deemed to be limiting thereof. All parts and percentages are by weight unless otherwise specified.

Catalyst Preparation

EXAMPLE 1

A catalyst was prepared as follows:

One inch diameter discs of about 0.015 inch thick Ni-12Mo alloy which had been expanded to a mesh having a diamond cell structure with dimensions of about 0.2 by 0.3 inch on a side were thoroughly cleaned by degreasing with acetone, lightly etching with 10 percent HCl, rinsing with water and, after drying, gritblasting with No. 24 grit $Al_2O_3$ at a pressure of 3.4 $kg/CM^2$ (50 p.s.i.).

The cleaned nickel molybdenum alloy discs were aluminized by applying a commercial flux and then dipping in a pot of molten aluminum at 675° C. for 1 minute to entirely coat the discs with aluminum. The aluminized discs were then heat-treated at about 725° C. for about 15 minutes in a nitrogen atmosphere to interdiffuse the nickel alloy and aluminum. After heat-treating, the discs were allowed to cool in a current of nitrogen for about 2 hours which produced a predominantly Beta phase structured, interdiffused layer on the surface.

The discs were then subjected to a leaching treatment in which the aluminum was selectively removed from the interdiffused layer to produce an active porous nickel-molybdenum surface on the discs. The leaching treatment comprised immersing the interdiffused discs in 20 percent NaOH at 80° C. for approximately 1 hour to dissolve away the excess aluminum and expose the catalytically active Beta phase. The appearance of the catalyst at this time is shown in FIGS. 2, 3 and 4. After leaching, the catalyst discs were first washed to remove loose material and then placed in the reactor of FIG. 5 while still wet and dried in a stream of hydrogen. They were then activated by continuing the flow of hydrogen at a temperature of about 300° C. for about 16 hours.

Continuous Oil Processing

EXAMPLES 2-6

Using the catalyst of Example 1 and a 2.5 cm diameter reactor as shown in FIG. 5, a disc stack height of about 75 cm, in which each mesh layer was spaced about 2.5 cm apart, said catalyst stack having a total weight of about 20 g, a volume of about 390 $cm^3$ and an active surface area of about 300 $m^2$, was assembled. After suitable activation, the reactor was cooled to about 70° C. and then filled with room temperature cold pressed, deaerated soybean oil having an iodine value of 132. This was then heated to a temperature of about 175° C., at which temperature, pump (119) was turned on. At the same time, hydrogen gas at a flow rate of about 0.4 $ft.^3$/min and a pressure of about 15 p.s.i.g. was admitted through gas inlet (117) with the resulting gas-/oil mixture passing upward through the catalyst stack.

Samples were taken hourly from the middle and top of the catalyst stack and analyzed for iodine value by the Wijs procedure and olefinic composition, from which selectivity is calculated, and percent trans-isomer conversion by gas/liquid chromatography. Essentially no difference was found in olefinic composition or iodine number between the "middle" and "top" samples taken at any time. Such a result is quite unexpected since results with packed catalyst beds usually show the "level" of the reaction to increase with the time of exposure of the reactants as they pass through the catalyst in the bed.

For each run, the reactor was operated for about 6 to 7 hours. System equilibrium was quickly reached and once established, the system could be operated without further adjustment. The reaction was terminated by shutting off the hydrogen supply to convertor (112), draining the partially hydrogenated oil therein and refilling it with fresh unprocessed oil at room temperature for the next processing run.

A total of 5 individual runs were made with the oil space velocity being incremented from about 8 to about 28. The results of these runs are given in Table IV.

EXAMPLES 7-9

The procedure of Example 5 was repeated but with the temperature being incremented from about 160° C. to about 205° C. The results obtained are given in Table V.

EXAMPLE 10

The procedure of Example 5 was repeated but with the hydrogen pressure being raised to about 30 p.s.i.g. The results obtained are given in Table V.

EXAMPLE 11

The procedure of Example 8 was repeated but with the space velocity being increased to about 35. The results obtained are given in Table V.

EXAMPLE 12

The procedures of Examples 2-6 were repeated with soybean oil, using the operating parameters of Example 5 for between about 6 to about 7 hours per day, for 28 days (about 200 hours total) during which time about 420 gallons (3360 pounds) of oil/pound of catalyst were processed. A comparison of the results at the "start" of this run with those at the "finish" is given in Table VI. Examination of the catalyst at the conclusion of this run showed no evidence of flaking, carbon buildup or other form of contamination or degradation on the surface.

TABLE IV

CONTINUOUS HYDROGENATION OF SOYBEAN OIL

| Ex. # | Catalyst | Temp. (°C.) | Pressure (psig) | Space Velocity (1/hr-kg) | Composition (%) C16:0/C18:0* | C18:1 | C18:2 | C18:3 | IV** | % trans-isomer | Isomerization Index | Selectivity |
|---|---|---|---|---|---|---|---|---|---|---|---|---|
| 2 | Ni—12Mo | 175 | 15 | 8 | 24 | 60.7 | 15.20 | 0.05 | 78 | 21.2 | 0.39 | 4 |
| 3 | Ni—12Mo | 175 | 15 | 12 | 20.4 | 49.3 | 28.5 | 1.8 | 98 | 11.9 | 0.35 | 2.4 |
| 4 | Ni—12Mo | 175 | 15 | 16 | 19.7 | 52.0 | 26.7 | 1.6 | 107 | 7.4 | 0.34 | 1.9 |
| 5 | Ni—12Mo | 175 | 15 | 20 | 19.4 | 43.1 | 35.7 | 1.8 | 109 | 6.8 | 0.30 | 2.4 |
| 6 | Ni—12Mo | 175 | 15 | 28 | 18.1 | 40.9 | 38.4 | 2.6 | 115 | 6.6 | 0.39 | 2.3 |
|  | Unhydrogenated Soybean Oil |  |  |  | 15.5 | 20.5 | 56.0 | 8.0 | 132 | 0 | — | — |

*The nominal palmitic acid (C16:0) content of soybean oil ranges between 11 and 13 percent and remains essentially unchanged during the hydrogenation process.
**Iodine value.

TABLE V

CONTINUOUS HYDROGENATION OF SOYBEAN OIL

| Ex. # | Catalyst | Temp. (°C.) | Pressure (psig) | Space Velocity (1/hr-kg) | Composition (%) C16:0/C18:0* | C18:1 | C18:2 | C18:3 | IV** | % trans-isomer | Isomerization Index | Selectivity |
|---|---|---|---|---|---|---|---|---|---|---|---|---|
| 7 | Ni—12Mo | 160 | 15 | 20 | 19.1 | 39.5 | 38.5 | 2.9 | 118 | 6.8 | 0.48 | 2.7 |
| 5 | Ni—12Mo (from Table IV) | 175 | 15 | 20 | 19.4 | 43.1 | 35.7 | 1.8 | 109 | 6.8 | 0.30 | 2.4 |
| 8 | Ni—12Mo | 190 | 15 | 20 | 20.9 | 53.0 | 26.0 | 0.1 | 98 | 15.4 | 0.45 | 6.0 |
| 9 | Ni—12Mo | 205 | 15 | 20 | 22.0 | 52.1 | 24.5 | 1.4 | 97 | 21.5 | 0.61 | 2.5 |
| 10 | Ni—12Mo | 175 | 30 | 20 | 20.4 | 48.7 | 29.1 | 2.0 | 106 | 12.9 | 0.48 | 2.0 |
| 11 | Ni—12Mo | 190 | 15 | 35 | 18.9 | 35.8 | 42.0 | 3.3 | 120 | 5.9 | 0.49 | 3.0 |
|  | Unhydrogenated Soybean Oil |  |  |  | 15.5 | 20.5 | 56.0 | 8.0 | 132 | 0 | — | — |

*The nominal palmitic acid (C16:0) content of soybean oil ranges between 11 and 13 percent and remains essentially unchanged during the hydrogenation process.
**Iodine value.

TABLE VI

LONG TERM HYDROGENATION OF SOYBEAN OIL

| | Product Processed (gallons)* | Composition (%) C16:0/C18:0 | C18:1 | C18:2 | C18:3 | IV** | Isomerization Index | Selectivity |
|---|---|---|---|---|---|---|---|---|
| start | 0.1 | 19.4 | 43.1 | 35.7 | 1.8 | 109 | 0.30 | 2.3 |
| finish | 420 | 20.1 | 42.8 | 33.9 | 3.2 | 116 | 0.45 | 2.0 |

*Per pound of catalyst.
**Iodine value.

EXAMPLE 13

Utilizing the procedure of Examples 2-6 and the catalyst of Examples 2-12, a series of consecutive uns were made in which soybean oil was successively replaced with corn, sunflower and finally linseed oil. Conversion from a first oil to a second was accomplished by draining from convertor (112), at the conclusion of the run, the warm partially hydrogenated "first" oil therein and replacing it with a charge of fresh "second" oil after which the system was brought up to temperature for further use. For comparative purposes, a 6-7 hour soybean oil run was made before the corn oil was processed and after the sunflower and linseed oils were run. At the conclusion of the example, the catalyst had been in service for a grand total of about 320 hours. The data for these runs is summarized in Table VII. Included in this table for comparative purposes are the results of Example 5.

TABLE VII

HYDROGENATION OF VEGETABLE OILS

| Oil | Total Oil Processed (gal.) | Process H2 Temp. (°C.) | Pressure (psig) | Space Velocity* | Composition (%) C16:0/C18:0 | C18:1 | C18:2 | C18:3 | IV** | Isomerization Index | Selectivity |
|---|---|---|---|---|---|---|---|---|---|---|---|
| Soybean (from Table VI) | 420 | 175 | 15 | 20 | 20.1 | 42.8 | 33.9 | 3.2 | 116 | 0.45 | 2.0 |
| Corn Oil (Fresh) |  |  |  |  | 14 | 26 | 59 | 1 | 126-128 |  |  |
|  |  | 175 | 15 | 20 | 18 | 38 | 44 | 0 | 111-113 |  |  |
|  | 65 | 175 | 15 | 10 | 22 | 42 | 36 | 0 | 106 |  |  |
| Sunflower (Fresh) |  |  |  |  | 14 | 22 | 64 | 0 | 133 |  |  |
|  | 65 | 175 | 15 | 20 | 17 | 33 | 50 | 0 | 121-125 |  |  |
| Soybean | 15 | 175 | 15 | 20 | 21 | 36 | 40 | 3 | 121 | 0.45 | 2.0 |
| Linseed (Fresh) |  |  |  |  | 11 | 22 | 19 | 48 | 176 |  |  |
|  | 45 | 175 | 15 | 20 | 13 | 26 | 19 | 41 | 167 |  |  |
|  |  |  |  | 8 | 16 | 28 | 18 | 38 | 155 |  |  |
|  |  |  |  | 2 | 19 | 33 | 17 | 31 | 144 |  |  |
| Soybean Final | 15 | 175 | 15 | 20 | 20 | 28 | 47 | 5 | 127 | 0.18 | 1.8 |
| Soybean | 15 | 175 | 15 | 20 | 19.4 | 43.1 | 35.7 | 1.8 | 109 | 0.3 | 2.4 |

TABLE VII-continued

| | Total Oil Processed (gal.) | Process H₂ Temp. (°C.) | Pressure (psig) | Space Velocity* | Composition (%) | | | | | Isomerization Index | Selectivity |
|---|---|---|---|---|---|---|---|---|---|---|---|
| Oil | | | | | C16:0/C18:0 | C18:1 | C18:2 | C18:3 | IV** | | |
| (From Ex. 5) | | | | | | | | | | | |

*Liters per hour-kg.
**Iodine value.

Summary of Continuous Processing Results

For the experiments conducted in Examples 12–13, a grand total of about 4800 pounds of oil/pound of catalyst were processed. The reactor system, once assembled was operated for about 320 hours in 6 to 7 hour increments without changing the catalyst or altering the general configuration of the system except to change the oil source. Such an operating mode is considered to be quite rigorous since the continuous surface expansion and contraction experienced as the system heats up and cools down should be expected to produce considerable strain in the active Raney coating bondline. As shown in FIGS. 6 and 7, these were not sufficient to cause structural failure in the bondline even after extended use. Further, during this time, soybean oil activity (as measured by the change in iodine value) declined only about 16 percent while the selectivity changed from about 2.4 to about 1.8. However, the isomerization index, which is a measure of cis-trans conversion, did not change significantly. Such long-term changes are not uncommon in many long-term catalytically enhanced continuous processing systems. In industries where this happens, the normal response is to either reduce the flow rate and/or raise the hydrogen back pressure and/or operating temperature. As shown by Examples 2-11, all of these options are available with the catalyst of this invention without the necessity of sacrificing the other operational advantages made possible by such use.

Batch Processing

EXAMPLE 14

Using the catalyst of Example 1 and a 2" diameter by 10" high reactor as shown in FIG. 8, 40 catalyst discs as shown in FIG. 2 and having a total weight of about 10 g were placed therein. The discs were supported by 4 mm diameter glass bars so configured as to occupy a volume of about 500 cm³ with an active surface area of about 120 m². The catalyst was activated by a stream of hydrogen flowing at a rate of about 250 ml/minute at 300° C. for 16 hours, after which the reactor was cooled to about 195° C. At this temperature, pump (218) is turned on and about 400 ml of cold pressed soybean oil are charged into vessel (212) while hydrogen was admitted through gas conduit (222) and sparger (224) at a rate of about 0.15 ft.³/minute at a pressure of about 20 p.s.i.g.

The product produced is a function of reaction time with the "crude" soybean oil progressively changing to salad oil, margarine and shortening as process time increases. With the catalyst of this invention and the process conditions described above (which are typical of those used in prior art batch operations) the conversion times for these changes are given below:

| Approximate Process Time (Minutes) | Iodine Value | "Product" |
|---|---|---|
| 2-3 | 110-118 | Salad Oil |
| 5-6 | 95-102 | Margarine |
| 7-8 | 80-90 | Shortening |

The change in olefinic composition and iodine value as a function of process is shown in FIG. 9.

COMPARATIVE EXAMPLE A

Using the reactor of Example 14, about 400 ml of cold pressed soybean oil and about 0.2 g of a commercial Raney nickel catalyst comprised of about 25 percent active material on a stearate carrier widely used for oil hardening, having an effective surface area of about 5 m³ charged. The reactor was then heated to about 195° C. at a hydrogen back pressure of 20 p.s.i.g. and a flow rate of about 0.15 ft.³/min. The approximate conversion times achieved were:

| Approximate Process Time (Minutes) | Iodine Value | "Product" |
|---|---|---|
| 30 | 110-118 | Salad Oil |
| 70 | 95-102 | Margarine |
| 90 | 80-90 | Shortening |

These are shown in FIG. 10 for comparison with the values of Example 14.

These examples demonstrate the efficacy of the catalyst of this invention for batch oil processing. While 10 g of the catalyst of this invention was utilized in Example 14, the term "catalyst" encompasses both the underlying inactive mesh substrate and the active Raney alloy surface derived from said substrate. As a result, the real comparative active material weights for the two catalytic materials are much closer than is indicated by the ratio of their gross weights. Consequently, the differences in time to produce a given product, as illustrated in FIG. 10 are real and not just due to a larger quantity of catalyst being used. Further, as noted previously, the commercial catalyst is discarded after just one use, whereas the monolithic mesh catalyst of this invention has a considerable capability for reuse.

Advantages of this Invention

The catalyst of this invention offers a number of advantages when compared to prior art granular or supported hydrogenation catalysts. Thus, as shown by the Examples, it is equally adept in hydrogenating oils in both continuous flow and batch processing reactions so that considerable versatility in the mode of application is possible. Further, the very long service life, higher C18:3→C18:2 selectivity, and lower cis-trans conversion and isomerization index are all highly advantageous when compared to published data for prior art hydrogenation catalysts.

There are other operational advantages accruing from the use of the mesh type catalyst of the present invention for hydrogenation. For example, most batch processes utilize a granular catalyst within a stirred reactor. This granular catalyst must be separated, for recovery or, more usually, disposal by either an external or internal filtration system built into the process stream. This requirement adds to both the expense and complexity of building and operating such systems. Further, the constant abrasion of the catalyst particles against each other reduces at least some of them to a size where they are nonfilterable, with consequent problems for additional processing. With the monolithic catalyst of the present invention, these problems do not occur.

In continuous processes, the procedure for changing feedstock sources is relatively simple. As shown in Example 13, it merely comprises draining the reactor of any partially hydrogenated oil remaining therein and replacing it with a different oil. The drained oil need not be discarded since it can be blended with either the "crude" input or hydrogenated output during the course of the run. Since the volume of partially hydrogenated oil is quite small, relative to the "input" or "output" the overall effect on the final product will, with proper controls, be quite small.

Still another operational advantage comes from the use of the mesh substrate. With granular catalysts, there are few effective remedies for old age or inadvertent poisoning. With the monolithic mesh structure of the present catalyst, when such an event occurs, the inactive surface can easily be stripped off, by sand blasting or chemical solution, and a new Raney surface generated from the freshly exposed substrate alloy. This extremely long effective life results in lower operating costs and either a higher output for the same capital investment or a lower investment for the same output as compared to present systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a method for hydrogenating triglyceride vegetable oils with hydrogen in the presence of a catalyst, the improvement comprising employing as said catalyst a structure comprised of a Raney metal alloy surface layer integral with and derived from a selected nickel alloy monolithic substrate mesh structure, wherein said surface layer is predominantly derived from an adherent Beta structured crystalline precursor outer portion of the formula $Ni_xM_{1-x}Al_3$ where M is a catalyst activator selected from the group consisting of molybdenum, titanium, tantalum, ruthenium, or mixtures thereof and where x, the fraction of nickel in the combined weight of Ni and M, is within the range of from about 0.80 to about 0.95.

2. A method for hydrogenating triglyceride vegetable oils comprised of a mixture of substantially linear aliphatic chains having varying amounts of saturated, and mono-, di- and tri-olefinic constituents comprising:
   (a) admixing hydrogen with said vegetable oil to form a mixture;
   (b) heating said mixture in the presence of a catalyst at a temperature in the range between about 125° C. and about 350°, said catalyst comprising a plurality of metallic mesh plates, each of said plates comprised of a Raney metal alloy surface layer integral with and derived from a selected nickel alloy monolithic substrate mesh structure, wherein said surface layer is predominantly derived from an adherent Beta structured crystalline precursor outer portion of the formula $Ni_xM_{1-x}Al_3$ where M is a catalyst activator selected from the group consisting of molybdenum, titanium, tantalum, ruthenium, or mixtures thereof and where x, the fraction of nickel in the combined weight of Ni and M, is within the range of from about 0.80 to about 0.95, whereby said vegetable oil is hydrogenated; and
   (c) recovering said hydrogenated oil.

3. An apparatus for the hydrogenation of a vegetable oil which comprises a reaction vessel having an inlet for said oil, an inlet for hydrogen gas, an outlet for hydrogenated oil, at least one layer of a catalyst structure within said reaction vessel, and means for contacting said catalyst with said oil and said hydrogen gas, said catalyst structure being comprised of a Raney metal alloy surface layer integral with and derived from a selected nickel alloy monolithic substrate mesh structure, wherein said surface layer is predominantly derived from an adherent Beta structured crystalline precursor outer portion of the formula $Ni_xM_{1-x}Al_3$ where M is a catalyst activator selected from the group consisting of molybdenum, titanium, tantalum, ruthenium, or mixtures thereof and where x, the fraction of nickel in the combined weight of Ni and M, is within the range of from about 0.80 and 0.95.

4. The method of claim 2 wherein said catalyst is formed by the steps comprising
   (a) coating the surfaces of a clean, non-porous metal base mesh structure of a nickel base alloy having from about 5 to about 20 percent of said catalytic activator therein with aluminum;
   (b) heating said coated mesh surfaces to a temperature of from about 660° C. to about 850° C. for a time sufficient to infuse a portion of said aluminum into the outer portions of said mesh structure so as to form an integral adherent crystalline alloy layer predominantly having a Beta structure in its outer portions, and
   (c) leaching out residual aluminum from said alloy layer until said Raney metal exterior surface is formed integral with said mesh structure.

5. The method of claim 2 wherein said catalyst activator is molybdenum.

6. The method of claim 2 wherein said catalyst activator is ruthenium.

7. The method of claim 2 wherein said catalyst activator is tantalum.

8. The method of claim 2 wherein said catalyst activator is titanium.

9. The method of claim 5 wherein $1-x$ is between about 0.10 and about 0.18.

10. The method of claim 6 wherein $1-x$ is between about 0.05 and about 0.1.

11. The method of claim 2 wherein said admixing is done by mixing a stream of gaseous hydrogen with said vegetable oil to produce a gas/liquid combination therewith, said hydrogenation reaction occurring when said gas/oil combination passes through a bed of said mesh catalyst.

12. The method of claim 11 wherein said vegetable oil is soybean oil.

13. The method of claim 11 wherein said vegetable oil is corn oil.

14. The method of claim 11 wherein said vegetable oil is cottonseed oil.

15. The method of claim 11 wherein said hydrogenating is effected at a hydrogen back pressure in the range between about 10 and about 45 p.s.i.g.

16. The method of claim 15 wherein said back pressure is between about 12 and 18 p.s.i.g.

17. The method of claim 11 wherein said hydrogenation temperature is between about 150° C. and about 210° C.

18. The method of claim 11 wherein said hydrogenation temperature is between about 170° C. and about 200° C.

19. The method of claim 11 wherein the space velocity of said gas/oil combination is between about 2 and about 35 liters of oil per hour per kilogram of catalyst.

20. The method of claim 19 wherein said space velocity is between about 16 and about 24 liters of oil per hour per kilogram of catalyst.

21. The method of claim 2 wherein said vegetable oil is admixed with hydrogen and heated in the presence of said mesh catalyst in a closed container.

22. The method of claim 21 wherein said hydrogenation is effected at a hydrogen back pressure in the range of between about 15 and about 60 p.s.i.g.

23. The method of claim 21 wherein said gas/oil admixture is heated to a temperature between about 150° C. and about 350° C.

24. The method of claim 21 wherein said reaction proceeds for a time of between about 2 to about 16 minutes.

25. The method of claim 2 further comprising the step of activating said catalyst prior to said hydrogenation.

26. The method of claim 25 wherein said activation comprises heating said catalyst in a flowing stream of gaseous hydrogen for a time of between about 2 and about 24 hours at a temperature of between about 250° C. and about 350° C.

27. The hydrogenation apparatus of claim 3 wherein said catalyst activator is molybdenum.

28. The hydrogenation apparatus of claim 3 wherein said catalyst activator is ruthenium.

29. The hydrogenation apparatus of claim 3 wherein said catalyst activator is tantalum.

30. The hydrogenation apparatus of claim 3 wherein said catalyst activator is titanium.

31. The hydrogenation apparatus of claim 27 wherein $1-z$ is between about 0.10 and about 0.18.

32. The hydrogenation apparatus of claim 28 wherein $1-x$ is between about 0.05 and about 0.01.

* * * * *

UNITED STATES PATENT AND TRADEMARK OFFICE
CERTIFICATE OF CORRECTION

PATENT NO. : 4,584,139

DATED : April 22, 1986

INVENTOR(S) : Thomas J. Gray, Norman G. Masse, Tai-Nang Huang, and Michael J. Morgan It is certified that error appears in the above-identified patent and that said Letters Patent is hereby corrected as shown below:

In column 2, TABLE I, line 3, delete "COMPSITIONS" and insert --COMPOSITIONS--.

In column 2, line 24, delete "refactors" and insert --refractory--.

In column 5, line 7, after "is" insert --produced by:--.

In column 6, line 37, delete "approximate" and insert --appropriate--.

In column 8, line 24, delete "structrued" and insert --structured--.

In column 8, line 26, delete "acitve" and insert --active--.

In column 15, line 44, delete "uns" and insert --runs--.

In column 18, line 30, after "$m^3$" insert --were--.

In column 22, claim 31, line 2, delete "1-z" and insert --1-x--.

Signed and Sealed this

Third Day of February, 1987

Attest:

DONALD J. QUIGG

*Attesting Officer*  *Commissioner of Patents and Trademarks*